United States Patent [19]

O'Connor et al.

[11] Patent Number: 5,182,023
[45] Date of Patent: Jan. 26, 1993

[54] PROCESS FOR REMOVING ARSENIC FROM WATER

[75] Inventors: Rodney J. O'Connor; Mark A. O'Connor, both of College Station, Tex.

[73] Assignee: Texas Romec, Inc., College Station, Tex.

[21] Appl. No.: 778,568

[22] Filed: Oct. 17, 1991

[51] Int. Cl.$^5$ .......................................... B01D 61/00
[52] U.S. Cl. ................................. 210/652; 210/650; 210/651; 210/661
[58] Field of Search ............... 210/650, 651, 652, 912, 210/721, 641, 638, 681, 688, 749, 781; 423/87; 211/661

[56] References Cited

U.S. PATENT DOCUMENTS

| | | | |
|---|---|---|---|
| 3,171,735 | 3/1965 | Malcolm et al. | 75/24 |
| 3,436,177 | 4/1969 | Spedden et al. | 23/172 |
| 4,014,787 | 3/1977 | Shorr | 210/651 |
| 4,149,880 | 4/1979 | Prater et al. | 75/117 |
| 4,201,667 | 5/1980 | Liao | 210/721 |
| 4,220,627 | 1/1980 | Fugleberg et al. | 423/42 |
| 4,240,826 | 12/1980 | Kangas et al. | 75/109 |
| 4,244,734 | 1/1981 | Reynolds et al. | 75/101 |
| 4,244,927 | 1/1981 | Reynolds et al. | 423/87 |
| 4,655,928 | 4/1987 | Milton et al. | 210/651 |
| 4,935,146 | 6/1990 | O'Neill et al. | 210/912 |
| 5,045,210 | 9/1991 | Chen et al. | 210/688 |
| 5,082,568 | 1/1992 | Holler | 210/688 |

Primary Examiner—Robert A. Dawson
Assistant Examiner—Ana M. Fortuna
Attorney, Agent, or Firm—John R. Kirk, Jr.; Mark A. Oathout; Gordon T. Arnold

[57] ABSTRACT

A process for treating arsenic-containing aqueous waste is described wherein the aqueous waste, treated if necessary to minimize the presence of materials which reduce the efficiency of reverse osmosis membranes, is passed through an ultrafilter to remove solids followed by a chemical treatment to adjust the pH to range from about 6 to 8 and to add antiscalants and antifouling materials, then following to subject the chemically treated filtrate to a reverse osmosis process to result in a permeate stream having less than about 50 parts per billion arsenic.

11 Claims, 2 Drawing Sheets

PROCESS FOR REMOVING ARSENIC FROM WATER

FIELD OF THE INVENTION

This invention relates to the removal of arsenic from water so that the water may be re-used as process or drinking water or disposed of safely and that a smaller volume of toxic waste be disposed of in an environmentally safe manner. The invention deals with a core process and pretreatment of waste to create a proper feed.

BACKGROUND OF THE INVENTION

Arsenic is a historical poison dramatized in literature, utilized in commerce and occurring in nature with other important resources. Arsenic compounds have long been used to prepare insecticides for agricultural and commercial uses and as wood preservatives. Arsenic naturally occurs in the waste of mining and smelting operations for minerals. These arsenic compounds find their way, or are dumped, into water impoundments and ground water. The problems of the presence of arsenic in ground water, surface water, and process waste streams are wide spread and troublesome.

The problems of groundwater, surface water, leachates, and process waste streams containing unacceptable levels of arsenates and other contaminants abound. Typical contaminated sites include manufacturers of arsenicals, certain wood treatment plants and other users of arsenicals, mining operations and leachates from abandoned mine tailings containing arsenates, various metallurgical operations, fly ash leachate from plants burning arsenic contaminated coal, and areas of heavy arsenicals application in agricultural, such as for cotton defoliation.

Such water is rarely, if ever, contaminated only by simple arsenates, since the sources of contamination typically contain additional toxic materials such as other forms of arsenic, e.g., arsenic (III) compounds organoarsenicals manufactured or naturally produced by chemical and/or biochemical process in soil or water; toxic metal ions, e.g., $Cu^{2+}$ and $Cr^{3+}$ from "CCA Process" wood treatment; or "heavy metal ions" from mine tailings leachates, etc., toxic anions, e.g., cyanide from certain metallurgical processes; and/or toxic organic species, e.g., biocides produced as additional products by arsenicals manufacturers, or "creosote" components from certain wood treatment operations.

Accordingly, any effective treatment of such contaminated water must address an entire spectrum of toxic species that may include anions, cations, and electrically neutral species. Effective treatment must reduce the concentrations of all of the toxic or hazardous contaminants to the very low levels required for reuse of treated water and/or to meet the increasingly stringent requirements of regulatory agencies for permitted sewer or surface discharge. Solving the arsenic contamination problem alone is not enough. It is not enough, either, to solve other contamination problems without addressing the arsenic problem.

Conventional methods of wastewater treatment are rarely, if ever, suitable for water contaminated by arsenates and other toxic or hazardous species, except as a "primary treatment" part of the new process described herein, especially when treated water must meet or exceed "drinking water" quality standards (1991 level, 50 ppb arsenic).

Many problems accompany conventional attempts to solve this problem, most of which depend upon chemical precipitations. For example, precipitation processes are taught in U.S. Pat. Nos. 4,244,927, 4,244,734, and 4,149,880, particularly for removing metals from the presence of arsenic-contaminated materials. Also U.S. Pat. No. 4,201,667 describes a precipitation process for removing arsenic from aqueous mediums in presence of phosphate by a coprecipitation. Some phosphate itself may remain in such amounts that disposition of the remaining aqueous materials may be either unusable or prohibited from discharge to the environment without additional treatment. Other patents describe processes for recovering arsenic in the presence of various desirable metals such as zinc and copper and the like. See, for example, U.S. Pat. Nos. 4,240,826, 4,220,627, and 3,171,735, as well as 3,436,177. Neither chemical precipitations nor absorption methods are well suited for "mixed species" wastewater treatment, and it is not uncommon to find treatment schemes that compromise on precipitation or absorption parameters to effect the "best over-all removal efficiency" in a way that one, or more, species are left well above proper discharge limits.

Arsenates pose an almost unique problem in water treatment because of the pH dependence of the relative concentrations of arsenate species. In even the simplest case, there are four interactive species in arsenate solutions: arsenic acid ($H_3AsO_4$, dominant at pH <3), dihydrogen arsenate ion ($H_2AsO_4^-$, dominant around pH 6), hydrogen arsenate ion ($HAsO_4^{2-}$, dominant around pH 10), and arsenate ion ($AsO_4^{3-}$, dominant at pH 12 and above). In intermediate pH ranges, significant concentrations of two differently protonated species occur. Further, precipitation and oxidation/reduction reactions of arsenates are highly dependant on pH. Consequently, treatments to remove arsenates from water face many more problems than those for removal of other wastes, and removal of arsenates to very low levels in the presence of other contaminants which must be removed is exceedingly difficult, and, insofar as is known, has not been previously accomplished.

Attempts have been made to reduce the arsenic content in an aqueous medium through precipitation processes such as described in U.S Pat. No. 4,201,667 for example, and while such removal is successful to a certain extent, large quantities of phosphate ion must be present to satisfactorily co-precipitate with the arsenic. Much of the development of the solutions to the problems for the removal of arsenic relate to attempts to recover other minerals, particularly copper as described in U.S. Pat. Nos. 3,436,177, 4,149,880, and 4,220,627, not to clean the water. Other processes for recovering other metal values in the presence of arsenic are described in, for example, U.S. Pat. Nos. 4,244,734 and 4,240,826. Arsenic metal values have been precipitated by treatment of the solutions with iron salts, lime, magnesium oxides, heavy metals such as barium and titanium, for example, and aluminum to mention only a few of the attempts. Almost uniformly attempts of this nature have failed to recover water that could be considered potable from the presence of the arsenic contamination. The present limit with respect to potable water is 50 parts per billion (50 ppb).

Ion-exchange treatment alone of a complex "raw" wastewater, or even of effluent from a precipitative pretreatment, will typically face low efficiency and high cost and may fail to achieve acceptable levels of particular species, simply because of the high ionic strength and the composition from the multiplicity of ions commonly found in such solutions, and will fail to remove neutral species.

Accordingly, it is an object of this invention to provide a process whereby arsenic may be removed from aqueous waste streams to the extent that the water may be returned to useful purposes.

It is a further object of this invention to provide a process whereby the arsenic becomes more concentrated and therefore more economically disposed of through environmentally safe procedures.

Most of the processes in the previously cited patents were designed to remove arsenic in metallurgical operations, routinely to levels at about 1 ppm. Large excesses of precipitating agent are often required which produces voluminous amounts of sludge, often gelatinous and difficult to dewater. Thus, attempts to achieve low levels of arsenic by these processes are generally unsuccessful, and excess precipitating agents pose major problems for any subsequent reverse osmosis treatment to achieve satisfactory arsenic levels.

It is a further object of this invention to provide an environmentally safe, economically sound process for removal of arsenic from aqueous lakes, streams, and aquifers.

It is a still further object of this invention to provide an economic and environmentally safe process for treating aqueous plant effluent streams to provide on-site protection of the downstream environment.

SUMMARY OF THE INVENTION

The foregoing and other valuable objects of this invention are accomplished by pretreating an aqueous arsenic contaminated waste stream to remove components which would reduce the efficiency of, or harm, reverse osmosis membranes through scaling, biological activity or fouling, normally by physically treating the aqueous arsenic waste stream to remove any suspended oil, if present, chemically treating arsenic in forms other than arsenate, if necessary, to oxidize these species to arsenate and precipitate it as its calcium and/or magnesium salt, while avoiding excess precipitant to minimize the scaling potential of the filtrate when it is concentrated by reverse osmosis membrane. This treatment is followed by filtration, or a series of filtration steps, to remove solids, either present in the waste stream in the beginning or resulting from the chemical treatment of the waste stream. This leaves only the smallest of particles in the arsenic contaminated waste water stream and also serves to have reduced part of the arsenic content.

The balance of the waste stream then proceeds through an ultrafiltration membrane to produce a substantially particle free arsenic-contaminated water. The arsenic values removed by the ultrafilter, as suspended solids and/or macromolecular complexes, can be recycled for further primary treatment in the process or disposed of. The effluent from the ultrafilter is treated with an acid, such as citric acid or acetic acid for example, to a pH value from about six (6) to about eight (8) with the addition of a biocide to prevent biological contamination of the reverse osmosis membrane and with antiscalants such as citric acid and sodium citrate and/or ethylenediaminetetracetic acid and its salts, particularly alkali metal salts, for complexing any other problem cations which may be present as potential scale-forming species for a reverse osmosis membrane. After the chemical pretreatment, the treated arsenic containing waste water is passed through a reverse osmosis membrane at a pressure of up to 1,000 pounds per square (psi) inch to produce a permeate of useful water, usually with an arsenic contamination level of less than about 50 ppb, or at a level low enough for economical ion exchange polishing to acceptable levels, and a reject stream containing the balance of the arsenic which can be either disposed of in an environmentally safe manner or recycled to one of several points in the process so that it may be further concentrated.

It is of a particular advantage in the practice of this invention that the permeate stream may be from about 50% to about 90%, normally from 70% to 85%, of the water entering the reverse osmosis membrane and thus significantly reduce the volume of arsenic containing water which now must be disposed of in an environmentally safe manner. Even 95% yield may be obtained with the simplest feed, such as rainwater contaminated with arsenic. Water which was otherwise useless, even dangerous, is recovered and the process of this invention results in long-life of the otherwise fragile reverse osmosis membranes.

Thus, the advantages of the process of this invention are clear and include a greater degree of arsenic removal than heretofore could be accomplished without leaving residual environmentally harmful materials behind. Another advantage relates to greater than expected throughput of recoverable, reusable, and potable water from the treatment of arsenic containing aqueous waste. A considerable advantage is the achievement of the above advantages at generally lower cost than other heretofore attempted arsenic removal processes.

DETAILED DESCRIPTION OF THE INVENTION

Although conventional treatments are most unlikely to be sufficient alone for treatment of complex waste streams containing arsenates, an appropriate selection of conventional methods can usefully, and economically, reduce contaminant levels for effective use of a high-efficiency ultra-filtration/reverse osmosis system to purify a high percentage of water to meet stringent water quality standards. Thus, a combination of selected conventional methods preceding proper UF/RO treatment can accomplish the desired goal under circumstances where neither conventional methods nor UF/RO alone would suffice. The inability of conventional methods to handle multi-component waste streams adequately is cured by the inherent multi-component removal capabilities of UF/RO, while the "bulk" toxic removal of selected conventional methods in a primary treatment provides a feedstream enabling UF/RO to operate for maximum throughput of purified water.

The process of this invention involves the removal of arsenic from aqueous arsenic containing waste almost regardless of its source. The primary step which allows removal of the arsenic values to a point below tolerance levels is the employment of reverse osmosis. To achieve the extraordinary result of this invention requires appropriate treatment of the waste be accomplished to produce a proper feed to enhance the performance of the reverse osmosis membrane. The general process scheme is shown on FIG. 1 wherein waste water 10 goes through a primary treatment step 20, where waste water based upon a preliminary analysis of the components is treated, usually at ambient conditions to remove components which would have an adverse effect upon the operation of the reverse osmosis system, to remove suspended solids, and, if necessary, to oxidize arsenic present as other then arsenate. The treated waste water would then be filtered by a relatively course filter 30 where the solids would be rejected through line 30a and the filtrate be subjected to a more fine filtration 40 to remove additional solids for disposal through line 40a. Thus with particle sizes remaining in the range of less than about 5 microns, the waste water would then proceed through an ultra-filtration step 50 which would render the waste water substantially solids free. The reject from the ultra-filtration step 50 would exit through line 50a where it would be returned to the primary treatment process 20. The filtrate from the ultra-filtration step 50 would leave through line 50b and proceed toward the reverse osmosis step 70.

Figure 1:
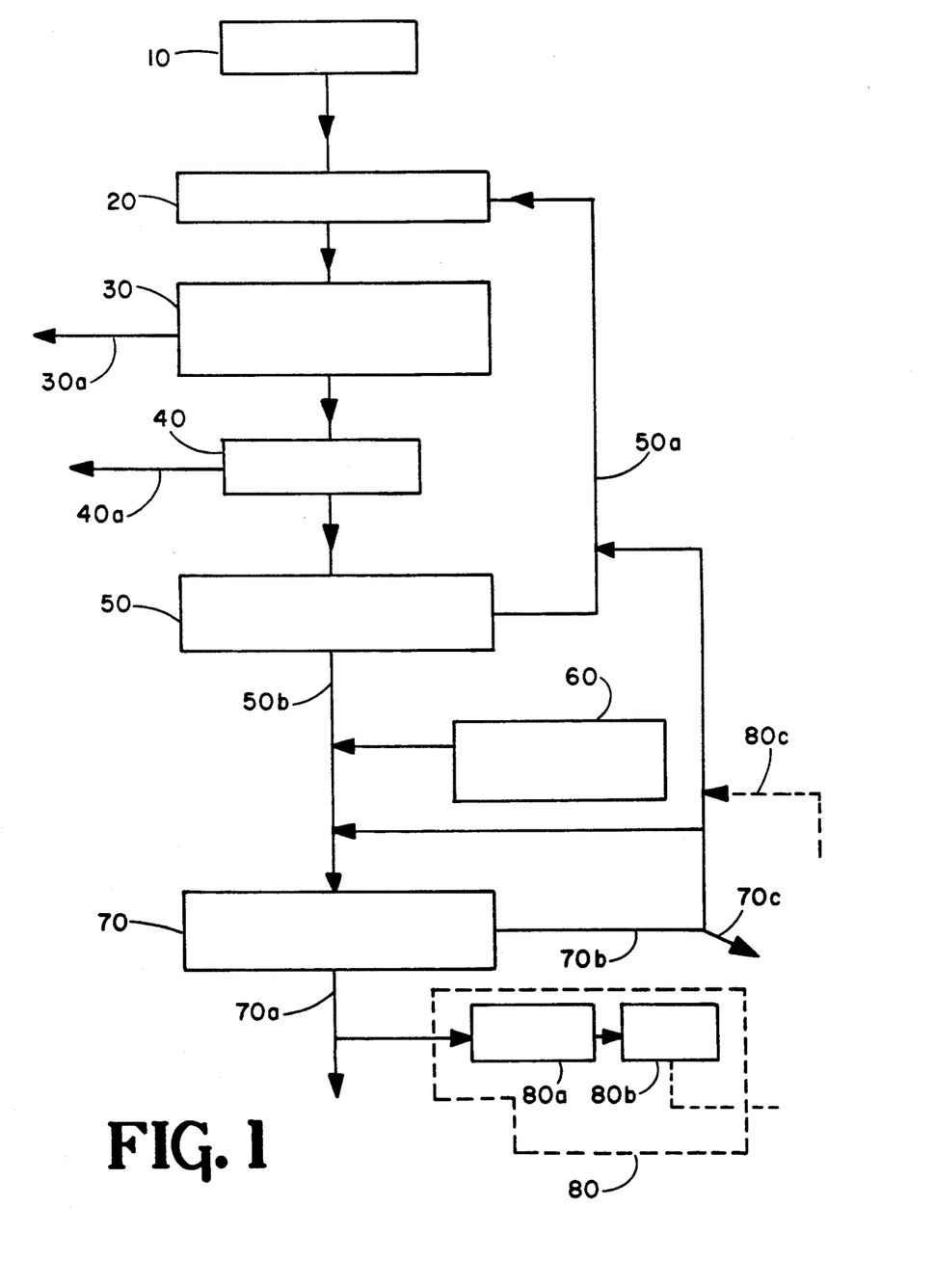
FIG. 1 is a block diagram showing the various steps, including optional treatments dependant upon the character of aqueous contamination, used in the process of this invention.

As an important part of the practice of this invention, the step which occurs between the ultra-filtration 50 and before the reverse osmosis step 70 is the chemical treatment 60. Chemicals are added to adjust the pH of the water to a range of from about 6 to 8, and add anti-scalants and anti-foulants as well as biocides, if needed, in order to protect the membranes of the reverse osmosis unit 70. Of course, there are many reverse osmosis membranes available but we have found that "sea water type" membranes; i.e., those membranes designed to desalinate high salt content brines, are especially preferred in the practice of this invention. We have found that if in the practice of this invention, the foregoing steps are followed with care and particularly the chemical feed additive step before the reverse osmosis step 70 that the waste water recovery amounts to from about 50% to about 90% of the water entering the reverse osmosis step 70. This permeate exits the reverse osmosis unit 70 through line 70a having an arsenic content of less than about 50 ppb, or at least low enough for economical polishing by ion exchange to an acceptable level of arsenic. If the criteria for purified water permits higher levels of arsenic, part of the reverse osmosis reject stream can be recycled to blend with reverse osmosis feed water to yield a higher over all conversion percentage of the original waste water. Part of the reverse osmosis reject can, as appropriate, be recycled through primary treatment where additional arsenic could be removed, thus ensuring both improved quality of permeate water and high overall conversion percentage. Of course, if higher arsenic levels can be tolerated an even greater yield of permeate is obtainable. In the event that yield is more important than arsenic content, then more arsenic could be accepted in the permeate and the higher end of recovery would result. That which is rejected by the reverse osmosis step 70 could be recycled through line 70b to the primary treatment zone 20 where additional arsenic could be removed using the other steps, such as precipitation, to free up more water for recovery. Alternatively, the arsenic-containing stream 70b could be sent to a permitted disposal site shown as line 70c. The permeate stream 70a could normally be reused as is but, in the event that excessive arsenic still abounds, the permeate stream 70a could be split and further treated by passing through a polishing zone 80 including, for example, an activated carbon pack 80a and/or an ion exchange resin 80b. Since the levels of arsenic are very low at this point in the process, the polishing would be very economically and easily accomplished since little activated carbon or ion exchange resin would be used by the small amounts of arsenic remaining, yet it provides extra safety if desired. When it is necessary to regenerate the ion exchange resin the regenerating water can be returned in line 80c to the recycle reject line 10b from reverse osmosis 70 or to the reject line 50a from ultrafiltration 50 and thence to the primary treatment 20 in the process.

Now having briefly described the major steps of the process of this invention greater detail bears discussion in order to assure the potential for scaling, plugging, or fouling of the membranes of the reverse osmosis unit is minimized so that the throughput and therefore the yield of useful water is not retarded. The purpose of the primary treatment 20 is to prepare the aqueous waste for final treatment. The important step in determining whether the waste water is suitable for treatment under the practice of this process, or some variant thereof, as will be discussed later, is the initial chemical analysis of the waste water. Of course the loading of arsenic and its forms should be determined. If the total arsenic is greater than about 10 ppm, in the aqueous waste, then pretreatment is highly desirable to improve the overall economics of the process since the operation of the reverse osmosis system would be more efficient at the lower levels with pretreatment being used to remove part of the arsenic values in the water. Also, if a significant amount of the arsenic has other than the plus five valence state, it may become desirable to oxidize it to the higher valence state where it would precipitate more easily. Such oxidation occurs by the addition of a suitable oxidizing agent such as hydrogen peroxide or a sodium or calcium hypochlorite. This would assist precipitation of the arsenate. The amount of oxidation agent necessary would, of course, depend upon the amount of low-valence arsenic present in the waste water. If arsenic is to be precipitated, the pH should be adjusted to the slightly basic range, i.e. from about 8 to 9.5, with addition of, preferably magnesium or calcium oxide with additional $Mg^{2+}$ and/or $Ca^{2+}$, as needed, (e.g., as magnesium chloride or calcium chloride) to form a precipitate as magnesium or calcium arsenate and without leaving excess material, such as a calcium sulphate, in solution which could cause scaling of the reverse osmosis membrane. The addition of iron, titanium or aluminum salts to precipitate arsenate should be avoided since these cations can cause scaling and/or fouling of the reverse osmosis membrane. If such membrane fouling materials are present in the waste water initially as would often be the case when dealing with metal processing tailings, then the concentration of those materials must be reduced in the waste water, preferably by precipitation and/or ion exchange. A further source of materials which may be present in waste water are toxic metals such as lead and mercury which should be typically reduced by precipitation as hydroxides. This can be done at the same time that the arsenate is precipitated or at different times if recovery processes are desirable. It further must be noted that ions, such as lead and mercury for example, may be separated from the water using the reverse osmosis membrane without adverse effects on the permeate or the membrane itself. This is particularly true if the toxic metals and the arsenic in the reject stream are both going to be disposed of using deep well injection. The presence of certain other toxic anions, such as cyanide, with the arsenates can also be handled by oxidation using a sodium or calcium hypochlorite or hydrogen peroxide. Care should be taken to prevent large excess of oxidizing agents stronger than arsenates to flow through the membrane since strong oxidizing agents at concentrations of greater than about 10 milligrams per liter (ppm) may cause damage to the membrane. A mild reducing agent such as bisulfite ion may be added in the form of sodium bisulfite at pH greater than about 3 to reduce the stronger oxidizing agents without also reducing arsenates. Having now added materials to the arsenic containing waste water which would precipitate many of the problem materials in the water, it now would be helpful to clarify the remaining waste water for further treatment. To assist in such clarification the solids may be agglomerated by adding a flocculating agent for removal by simple clarification and filtration techniques known in the trade. Again, the well known aluminum or iron flocculating agents should be minimized because of the effect iron and aluminum hydroxides have on a membrane. Alternatively, one could use one of the wide range of polymeric flocculating agents well known to those skilled in the art. These flocculating agents are available in anionic, nonionic, and cationic forms. The nonionic polymeric flocculating agents are most useful in the practice of this invention, provided that excess is avoided as potentially fouling to the ultrafiltration membrane. A particularly preferred nonionic flocculating agent is "Magnifloc" 515c (American Cyanamid Cr., Wayne N.J.). It is to be remembered that it is important in the determination of which embodiment of the process of this invention to use for a specific arsenic containing waste water that chemical analysis every step of the way be performed so that once the entire process is developed, the reverse osmosis membranes are protected from the presence of hurtful or damaging materials. If the potential for scaling of these membranes remains high in the aqueous waste, such as from aluminum or iron cations or calcium sulphate concentration, then all or part of the waste water should be passed through a conventional water softener, sodium-form cation exchange resin or chloride form anion exchange resin, as appropriate. A rule of thumb to be used in determining whether the concentration is high or not would be about 10 ppm aluminum, 5 ppm iron or 100 ppm sulfates. While these amounts are well within the solubilities of these materials in water, when concentration occurs in the reverse osmosis system the concentration could exceed the solubility of the salt, especially at the membrane-water interface, thus causing precipitation, or scaling, on the surface of the reverse osmosis membrane. It is this scaling and fouling which previously occurred prior to the practice of this invention which has caused a wide belief that reverse osmosis is not satisfactory for arsenic removal, certainly not to the low levels possible in the practice of this invention. Previously water treatment utilizing reverse osmosis was fraught with down time due to scaling and fouling.

In addition to scaling and fouling due to the presence of ions in the water, biological contaminants may be present. In the core treatment of this invention a biocide is added, as needed, to control the particular biological contamination.

Also, it will not be uncommon that waste water may contain organic materials, particularly if this invention is used to recover water from API refinery sludges found in and around refinery sites. Prior to the above described pretreatment, an oil/water separator, well known to those skilled in the art as mentioned in U.S. Pat. No. 4,366,063, for example, incorporated herein by reference for all purposes, would be used to remove significant concentrations of oils or hydrocarbons. If the organics present are low in quantity and readily volatile then air stripping or carbon absorption could be used. Of course, the economics of the overall process may tend to break down in direct proportion to the amount of volatile or absorbable organic materials present in the system.

The selection of the primary treatment step to use, as described above, depends entirely upon the composition of the waste water. For example, if a relatively clean arsenic contaminated waste water such as, for example, an effluent stream from a plant, it might be possible to bypass these pretreatment steps altogether and introduce it directly into the ultra-filtration step. However, the pretreatment would probably be necessary in the other conditions where arsenic contaminated aqueous wastes are found such as, for example, in lagoons or groundwater around coal fired power plants, insecticide manufacturing facilities, or wood treatment plants, the water in some aquifers or holding ponds, or other waters normally found in the environment which are typically laced with soluble salts and/or suspended solids.

However, once the water is treated as set forth above it would include significant amounts of solids which may or may not settle upon standing. Whether or not such settlement would occur, the economics of a continuous process requires that a separation of the solids from the liquid take place. This could be done by centrifugation or a coarse filtration where solids from about 20 microns in diameter or up are removed by filtration. This can be done with a relatively coarse filter and such filtration step could be varied easily based upon the overall loading of solids to be expected from chemical analysis of the waste water to remove more or less of the particles present. If the loading of particles larger than about 20 microns is small then this coarse filter could be sized and designed to remove some of the even smaller size particles, ones to about 5-10 microns for example.

Thus it proceeds to the solids removal step. Preferably the total solids would be reduced in this step leaving only those in the filtrate having less than 20 microns size in diameter and at a concentration of less than 100 mg/L (ppm). The solids removed from the filter then would be discarded in an environmentally safe manner or, if there are values in the solid making recovery economically interesting, then such recovery could then result.

If the solids concentration is sufficiently low in the waste water after the primary treatment step 20, say less than about 100 ppm, the waste water 10 could then be carried on to a finer filtration where the particles down to about 5 microns would be removed, as a fine filtration step. The selection of the filter for this fine prefiltration step is well within the skill of those in the art and the solids may be removed for disposal through line 40a for further processing or combining with the solids removed from the coarse filtration step 30 in line 30a and either disposed of in an environmentally safe manner or processed further to recover the materials present, if desired. Such recovery is not a part of this invention. The filtrate from the fine filtration step 40 would retain only very small amounts of solids and is prepared for the entry into the core process of this invention. The preceding described steps may be added or subtracted as the analysis of the waste water dictates. If there are slight particles and little or no dissolved solids which pose a threat to the reverse osmosis membrane, then the ultra-filtration step 50 may occur directly on the waste water stream, and this will often be the case where a contaminated rain water or process water must be treated prior to disposal or for recovery of dissolved arsenic. If there are dissolved solids, such as calcium sulfate, which do pose a threat of scaling the reverse osmosis membrane, then all or part of the filtrate may be passed through an appropriate ion exchange "softner", well known in the trade, between the fine filter 40 and the ultrafiltration step 50, to reduce the amount of antiscalant otherwise needed after ultrafiltration.

The filtered water leaves the ultra-filtration step 50 being substantially free of particulates and is subjected to chemical feed step 60 to prepare it for contact with the reverse osmosis membrane where the primary separation of useful water from arsenic contamination occurs. The chemical feed stream 60 is primarily used to adjust the pH of the water to from about 6 to about 8 and preferably from about 6.5 to about 7.0 since this is the range wherein the scaling potential of the materials within the waste water are minimized. While the pH can be adjusted with many acids those which would introduce potentially scaling anions such as the sulphate or phosphate ion to the solution are to be avoided, Therefore, among the mineral acids dilute hydrochloric acid is substantially the only choice. Nitric acid, for instance, adds toxic materials to the water. Low molecular weight organic acids like acetic acid would be satisfactory also. Preferably however, an acid would be selected that would perform other needed purposes within the waste water such as anti-scaling, anti-fouling, or biocidal activity. The preference is an acid such as citric acid which not only would serve to adjust the pH in the solution but acts as an anti-scaling agent. Citric acid could be added in the company of sodium citrate or ethylenediaminetetraacetic acid (EDTA) and serve as an anti-scaling and anti-fouling material for the reverse osmosis membrane. With respect to biocidal activity again, as stated before, it is important, at least biologically, to reduce biological contamination, and determination of such contamination in analysis of the waste stream from the beginning would dictate the biocide to be used in the practice of this process. For example, one such biocide is know as MicroTreat TF available from the King-Lee Chemical Co. in San Diego, Calif.

The concentration and dosage rate of the anti-scalants, anti-foulants, biocides, and acid for adjusting pH is determined, of course, by the concentration of contaminants, if any, present, and the rate of flow of the waste water stream from the ultra-filtration step 50 to the reverse osmosis step 70. As will be discussed later, the waste water stream contaminated with arsenic should be mixed with the treatment materials as it moves towards the reverse osmosis step 70.

The reverse osmosis step 70 and the overall system is designed to accommodate certain throughput of waste water. Although many acceptable reverse osmosis membranes may be available or become available, presently the "sea water type" membrane is preferable. Such membranes are well know to those of skill in the art. These are used in order to achieve the high throughput and salt rejection which is important to achieve the purposes of this invention. Thus, it is apparent that the pretreatment effectively eliminates scaling, fouling, and build up on the membranes. While rejection can be accomplished at lower throughputs using lower pressure, so-called brackish water membranes operating at pressures below about 400 psig, the objectives of the invention are better accomplished utilizing the previously mentioned sea water membranes operated at pressures from about 300 to about 1000 psig. The permeate recovered from the reverse osmosis system, which normally would be several membrane modules operating in a usual manner either in series or parallel, depending upon the particular situation, is recovered through line 70a (FIG. 1) having usually less than 50 parts per billion arsenic after the foregoing treatment is completed. This permeate can be used as process water, boiler feed water, and even potable water by virtue of the removal of substantially all harmful ingredients present through the practice of the system of this invention. It is remarkable that, even with such high rejection of arsenic, a recovery of from about 50% to about 90% of the water which initially entered the reverse osmosis part of the process of this invention is possible. Depending upon the pretreatments required, the yield, even based upon raw feed water, far exceeds those previously known to achieve acceptable water quality.

A portion of the reject stream 70b from the reverse osmosis containing the arsenic salts may be recycled to the reverse osmosis feed stream 50b to achieve a steady state composition for treatment and to maximize conversion to purified water within the optimal operating conditions. Of course this will be determined by the total dissolved solids which effect the operating pressure of the membrane and therefore the throughput yield and water quality of the permeate. While it will operate at higher pressures and achieve satisfactory results, it is not a desirable long-term operating condition. Of course recycling increases the concentration of dissolved solids on the membrane and thereby increases the scaling potential if the solubility of such solids on the membrane is exceeded. A further amount of the reject can be recycled all the way to the primary treatment step 20 if desired and a third amount determined as a matter of economics and quality of the steady state operation of this system can be disposed of, removing arsenic from the system by a permitted disposal process 70c. This also can serve to increase the yield of permeate.

As stated before, the reverse osmosis membrane system used could involve use of a combination of brackish water and sea water membranes in series rather than the system described above as long as the reserved permeate exits sea water membrane. As mentioned before, periodic sampling of the various water streams is necessary to monitor the operation of the entire system, particularly the reverse osmosis permeate where the permeate quality is critical. In the event that undesirable arsenic, or other toxic components, quantities show up in the permeate, it would be well to consider a polishing step 80 of activated carbon 80a or ion exchange 80 or both in order to obtain and maintain superior permeate quality in the practice of this invention.

All or a portion of the permeate stream 70a could be passed through an activated carbon bed, well known to those skilled in the art for these purposes, to remove additional materials absorbable by activated carbon. It is preferable to locate the activated carbon polishing after the reverse osmosis since such carbon must be either replaced or reactivated, and a system placement of the reverse osmosis membranes upstream of the activated carbon 80a reduces the quantity of impurities which would be absorbed on the carbon up to 90%, thereby prolonging the useful life of the carbon.

Another optional alternative for polishing the permeate stream would be an ion exchange bed which would be determined by the particular permeate quality and requirements of the customer. All Known ion exchange beds with a strong base hydroxide form anion exchange resin removing toxic anions such as, for example, residual arsenates, would be one choice. Another would be the strong acid cation exchange resin (normally a sodium or hydrogen ion form) to remove cations such as heavy metals. If pH adjustment is necessary in the event ion exchange is used an innocuous material such as dilute hydrochloric acid or sodium hydride could be used, for example. As described above, this total integrated system has much flexibility built into it based upon the concentrations of, and character of, impurities within the water streams. Throughout the process ambient temperatures of the water can be tolerated. This is true of pressure also expect through the ultra-filter and the reverse osmosis membrane. Only the barest essentials have been described with operating circuitry, sensors, and control devices since such would be well within the skill of the ordinary practitioner. The system flexibility allows units to be designed to be placed at the source of the contaminated aqueous stream such as a well which is removing contaminated water from an aquifer either for use or to return to the water stream to rehabilitate the aquifer. A unit for practicing the system could be placed on an aqueous plant stream to capture pure water (permeate).

Figure 2:
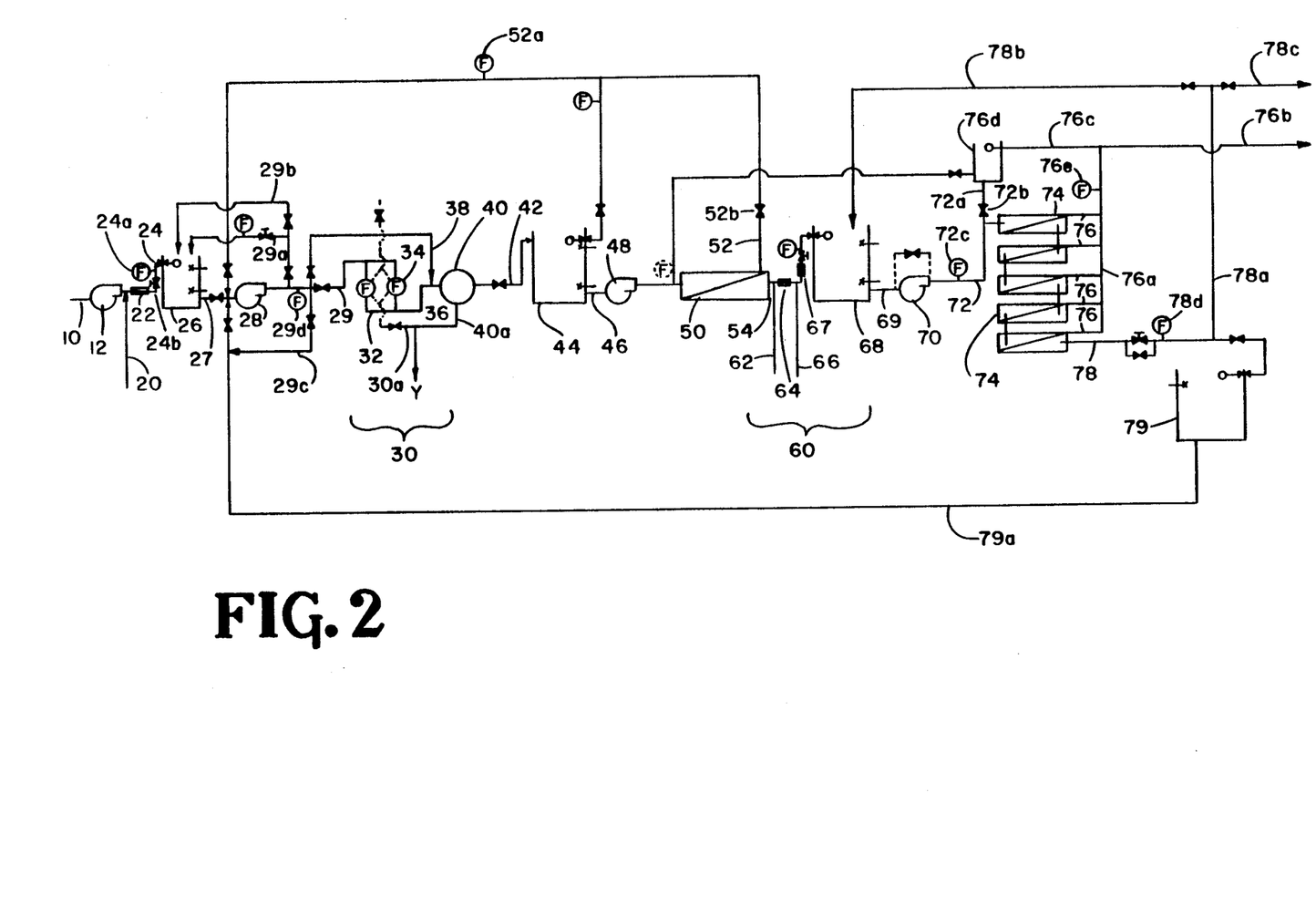
FIG. 2 is a more detailed flow sheet of a preferred embodiment of this invention, including an embodiment used for the examples of treatments described herein.

Having now described the general process configuration, as further specific description of this invention, FIG. 2 is considered. The waste water 10 enters the system through pump 12 and is immediately contacted by chemicals as described above for pretreatment through line 20 which are mixed with the waste water in a static mixer 22 proceeding through line 24 to holding tank 26 where the primary treatment takes effect to adjust the pH, allow precipitation to begin and flocculation to occur, whichever is appropriate, depending upon the analysis of the water 10. The flow of waste water through pipe 24 is measured by flow meter 24a and controlled by valve 24b. Tank 26 may include a means for agitating to achieve additional mixing if necessary. Since flocculation and settlement needs to occur the fluid in the tank may be quiescent. The chemically treated waste water would exit tank 26 through line 27 and thence to pump 28 where the waste water would move through line 29 to the filtration step 30. The effluent of the pump 28 in line 29 would be equipped with a recycle loop 29a to control the flow and yet maintain pump pressure and a pressure release line 29b, both loops recycling the waste water to tank 26a. A further recycle loop 29c would be used to adjust the flow to the filter step as measured by flow meter 29d by recycling the waste water to the intake of pump 28.

In the filtration zone 30 the waste water proceeds in line 29 to filters 32 and 34 where the large particle materials coarse filtration step, are removed. The filters 32 and 34 are piped such that they may be used alternatively while cleaning occurs on the out of service filter with the solids removed through line 30a. The waste water thus filtered moves through line 36 to a filter which will restrict even smaller particles 40, "fine" filtration. In the event that the waste stream flowing on line 29 does not have particles of size to require the use of a more coarse filter, a bypass 38 is shown on FIG. 2. The fluid stream 36 flowing through filter 40 removes solids through line 40a for ultimate disposal. The thus filtered fluid now with particles sizes no greater than about 5 microns, exits through line 42 to holding tank 44 where it is now considered to be prepared satisfactorily for treatment in the core of the process of this invention, ultra-filtration, chemical treatment and reverse osmosis, in that order.

At this point in the process the treatments required to prepare the waste stream for removal of arsenic have been accomplished. The arsenates removable by precipitation are presumably gone as are the large portion of ions which could result in membrane fouling or scaling and other harmful materials which would act to both reduce the throughput of the membranes at a later time as well as to affect the quality of the permeate recovered. As stated before, some arsenic contaminated waters treated by the process of this invention could possibly enter the system at this point without pretreatment but most would require at least some of the aforementioned treatments and operations.

Accordingly, the treated waste water contained in tank 44 exits through line 46 and feed pump 48 and thence enters an ultrafilter 50 as described herein above. The preferred ultrafilter used would be the best available membranes, preferably a polyvinylfluoride having an molecular weight cut off of about 1,000 (less than 0.002 microns); i.e. particles having a molecular weight greater than about 1000 are rejected. A usable range of molecular weight cut off would be from about 600 to about 10,000. In the practice of their invention, the superior results may be obtainable under certain conditions where particles pass through the ultrafilter having a diameter of less than about 0.5 microns. A maximum size of less than about 0.1 microns is preferred. The flow rate through the ultra-filtration membrane would be determined by the ultimate desirable flow rate of waste water to be treated. The ultrafilter relies on a high backside flow rate to keep the membrane scoured clean, so often the feed pump 52 operates at a flow rate three to four times higher than the system output, with the majority of the flow being rejected and recycled back to the start of the system for retreatment. Ultrafilter membranes are operated in series or, in order to increase the flow of a particular unit, can be set up to operate in parallel with various sizes of filters available, as are well known to those in the art. It is the presence of the ultrafilter which makes the waste stream substantially particle free (largest particle size being less than about 0.5 $\mu$) and prepares it for the final chemical treatment, based upon analysis, preferable an analysis coming out of the ultrafilter so that the water treatment, though not necessary, can be as precise as possible to avoid scaling, fouling, or biological contamination of the membrane while operating at maximum yield and permeate quality. The reject in ultrafilter 50 exits through line 52 where it may be recycled back to the pretreatment zone on the inlet side of pump 28 or the feed bank 44 for ultrafiltrater 50. The flow through line 52 would be measured by a flow meter 52a and adjusted to proper recycled amount in valve 52b. The filtered stream exits through line 54, where it would enter the chemical treatment zone 60 and, if needed, biocide would be added through line 62 and mixed through in-line static mixer 64. Anti-scalant and anti-foulants would be injected into the waste water stream through line 66 and mixed through in-line static mixer 67 with the now chemically treated waste water discharged into tank 68 for holding as a feed to the reverse osmosis treatment in the system. The waste stream exits the chemical treatment are holding tank 68 through line 69 and thence into the reverse osmosis feed pump 70 which should be selected to provide pressures up to and exceeding 1,000 psig against the membranes of the reverse osmosis system. The pressure range would normally range from about 300 psig for very low contamination levels to about 1000 for higher levels. Recycle of reject, contaminated water can be used to increase membrane pressures if needed for optimum operation. The pump effluent through line 72 directs the waste water to reverse osmosis membrane cartridges 74 (in FIG. 2 shown as being piped in series) on the membrane side with the permeate exiting through line 76 to manifold 76a, where the permeate is conducted away for use through line 76b or through line 76c to a holding tank 76d for use as a flush stream for the ultrafilter 50. As shown on FIG. 2, line 72a also communicating with tank 76d can act as a bleed line for a pressure release valve 72b set at the operating pressure for the reverse osmosis membrane 74. The reject stream containing the arsenic contaminants leaves the reverse osmosis membranes 74 through line 78 and thence to a reject storage tank 79 form which a reject stream 79a for recycling to the entry of the system is shown. The reject stream 78 can be recycled through lines 78a and 78b to the reverse osmosis storage feed tank 68 for pressure maintenance on the membranes as previously described or a bleed through 78c to a permitted disposal facility could occur.

The system specifically described in FIG. 2 was designed for a waste water which, after treatment, did not require polishing with activated carbon or ion exchange which therefore is not illustrated. Many modifications and variations of this process scheme are probable based upon the analysis of the waste water streams. Following such analysis and the above discussion concerning the criteria with respect to successful operation of the core removal portion of this invention, would allow the skilled chemist and/or engineer to develop and design processes of various sizes to treat many arsenic containing waste streams. In that regard, to assist in such consideration to design and operation of the system, the following actual example is given by way of illustration and not limitation of the foregoing invention.

EXAMPLE ONE

The following test was run to test 65,000 gallons of surface water held in a lagoon having an arsenic content of 1.4 ppm in a unit designed for the practice of this invention substantially as shown on FIG. 2 and described above. It was designed to operate on a flow rate of 15, plus or minus, 0.5 gallons per minute. The ultrafilter involved three 8" diameter modules made of polyvinylfluoride having a molecular weight cut off of 1,000. They were an SEPA-VF mod. 815 PT1 Osmonics, Inc., Minnetonka, Minn., encased in a fiber glass pressure vessel. Also, fifteen 4" sea water type reverse osmosis membranes were arranged in series in five stainless steel reverse osmosis pressure vessels. The membranes were model S.W.30-4040 thin film composite sea water type membranes 4" diameter from FilmTech, Inc., Minneapolis, Minn. Standard valves, fittings, gauges and flow meters were used to operate the process.

The system included an ion exchange polishing step on the permeate stream from the membranes. The ion exchange was a strong base anion-exchange, hydroxide form, system. The tests were run for twelve days with a four day hiatus between day three and day four. The tests and conditions with results are shown on Table 1, following, with the percent throughput determined by reading the flow meters on the permeate outlet 76c and the reject stream 78d. The first filter step removed solids greater than 5 microns in size. This pilot test successfully converted 44,873 gallons out of a lagoon containing 60,000–65,000 gallons of water contaminated with approximately 1.4 ppm arsenic, into water suitable for discharge or reuse with less than 50 ppm arsenic. This test demonstrated one of many areas of application for this invention where the arsenic level was too low for precipitation but the total dissolved solid of the water was too high to make ion-exchange alone economical.

TABLE I

| Day | Feedwater Temp. (°F.) | R.O. Pressure (psi) | Throughput, % | Arsenic Content (ppm as "As") | | | Volume Discharged (gallons) |
| | | | | Feed | R.O. Permeate | Final Discharge | |
| --- | --- | --- | --- | --- | --- | --- | --- |
| 1. | 73° | 500 | 75 | 1.38 | 0.027 | 0.002 | 500 |
| 2. | 73° | 560–920 | 73–79 | — | — | 0.001 | 1,949 |
| 3. | 73°–74° | 760–880 | 64–78 | — | — | 0.005 | 2,623 |
| 4. | 72°–74° | 400–470 | 66–77 | — | 0.033 | 0.016 | 3,651 |
| 5. | 73°–76° | 340–580 | 50–73 | — | 0.020 | 0.014 | 5,087 |
| 6. | 65°–68° | 400–450 | 58–68 | — | 0.028 | 0.027 | 4,000 |
| 7. | 59°–64° | 440–460 | 56–72 | — | — | — | 4,791 |
| 8. | 60°–63° | 450–460 | 54–69 | — | 0.023 | 0.013 | 4,022 |
| 9. | 56°–67° | 450–600 | 53–66 | 3.4 | 0.003 | 0.001 | 5,825 |
| 10. | 55°–70° | 390–600 | 53–75 | — | — | — | 6,006 |
| 11. | 56°–64° | 456–465 | 47–68 | — | — | 0.003 | 2,907 |
| 12. | 57°–59° | 460–470 | 47–66 | — | — | 0.013 | 2,075 |
| 13. | 56°–61° | 470–490 | 45–66 | — | — | 0.006 | 1,437 |

*Does not include recycled R.O. Reject (which permits up to an additional 16% net conversion). Low % throughputs reflect normal temperature effects on membrane performance or low pressure tests. The overall percentage conversion for the total test run was 75% of the original wastewater.

From the foregoing discussion and examples, one of the skill and the background to understand water treatment and processes involved in reverse osmosis, would understand that many changes and modifications applicable to the foregoing process to treat many varied arsenic containing waste streams may be made to produce permeate of useful, even potable, quality without departing from the scope and content of the appended claims.

We claim:

1. A process for treating a arsenic-contaminated aqueous waste to recover usable water comprising the steps of:
   passing the arsenic-contaminated water through an ultrafilter membrane to remove solids to create an arsenic-containing aqueous filtrate
   chemically treating the filtrate to produce a filtrate having a pH of from about 6 to about 8; and
   subjecting the filtrate to reverse osmosis at elevated pressure of up to about 1,000 psig to yield a permeate stream having less than about 50 ppb arsenic and a reject stream containing the balance of the arsenic.

2. The process of claim 1 wherein the permeate stream contains from 50% to about 90% of the water entering the reverse osmosis membrane.

3. The process of claim 2 wherein the permeate stream contains from 70% to about 85% of the water entering the reverse osmosis membrane.

4. A process for recovering water from arsenic-contaminated aqueous waste stream which comprises the steps of:
   pretreating the aqueous waste streams to remove components which would reduce efficiency of or damage a reverse osmosis membrane;
   filtering the treated waste stream to remove particles of a size of greater than about 5 micron diameter;
   passing the filtered waste stream through a membrane ultrafilter to recover substantially particle-free arsenic contaminated water;
   adjusting the pH of the substantially particle-free arsenic-contaminated water to a value of from about 6 to about 8; and
   passing the arsenic-contaminated water through a reverse osmosis membrane to produce from about 50% to about 90% of the water as a permeate stream of useful water and a reject stream containing the arsenic; and
   recovering the permeate stream.

5. The process of claim 4 wherein the ultra-filter rejecting particles having a diameter of from about 0.1 microns to a maximum molecular weight of 1000.

6. The process of claim 4 wherein a portion of the reject stream from the reverse osmosis step is a recycled to the process and the rest is recovered for final treatment and disposal.

7. The process of claim 4 wherein the recovered permeate stream is discharged to nature.

8. The process of claim 4 wherein the water is passed to the reverse osmosis membrane at a pressure of from about 300 to about 1000 psig.

9. The process of claim 4 comprising the additional step of:
   passing the recovered permeate stream through a polishing step to remove residual ions.

10. The process of claim 9 wherein the polishing step comprises:
    passing the permeate through an ion exchange resin.

11. The process of claim 4 wherein ion exchange is used to reduce the concentrations of ions that might cause scaling of reverse osmosis membranes, prior to passing the water to the reverse osmosis membrane.

* * * * *

UNITED STATES PATENT AND TRADEMARK OFFICE
CERTIFICATE OF CORRECTION

PATENT NO. : 5,182,023

DATED : January 26, 1993

INVENTOR(S) : Rodney J. O'Connor; Mark A. O'Connor

It is certified that error appears in the above-identified patent and that said Letters Patent is hereby corrected as shown below:

Col. 1, lines 40-41: correct "compounds organoarsenicals" to -- compounds; organoarsenicals --

Col. 6, line 2: correct "70acould" to -- 70a could --

Col. 9, line 33: correct "avoided," to -- avoided. --

Col. 11, line 12: correct "Known" to -- known --

Col. 14, line 35: correct "50 ppm" to -- 50 ppb --

Signed and Sealed this

Eighteenth Day of January, 1994

Attest:

BRUCE LEHMAN

Attesting Officer

Commissioner of Patents and Trademarks